May 31, 1966   W. D. AYRES, JR   3,253,693
TRANSFER MECHANISM FOR REMOVING ARTICLES FROM CONVEYOR
Filed July 8, 1964                                3 Sheets-Sheet 3
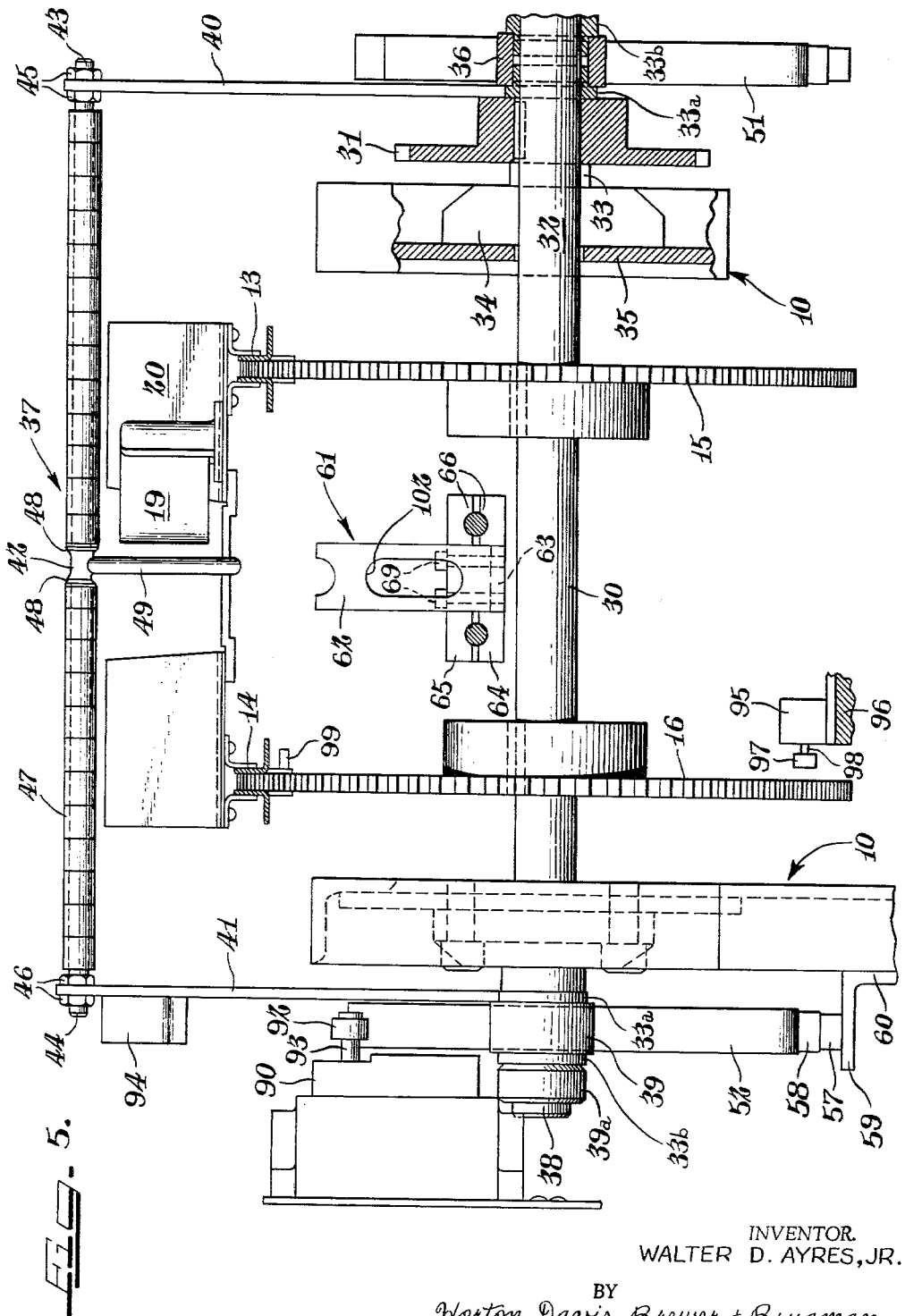
INVENTOR.
WALTER D. AYRES, JR.
BY
Horton, Davis, Brewer & Brugman
Attys.

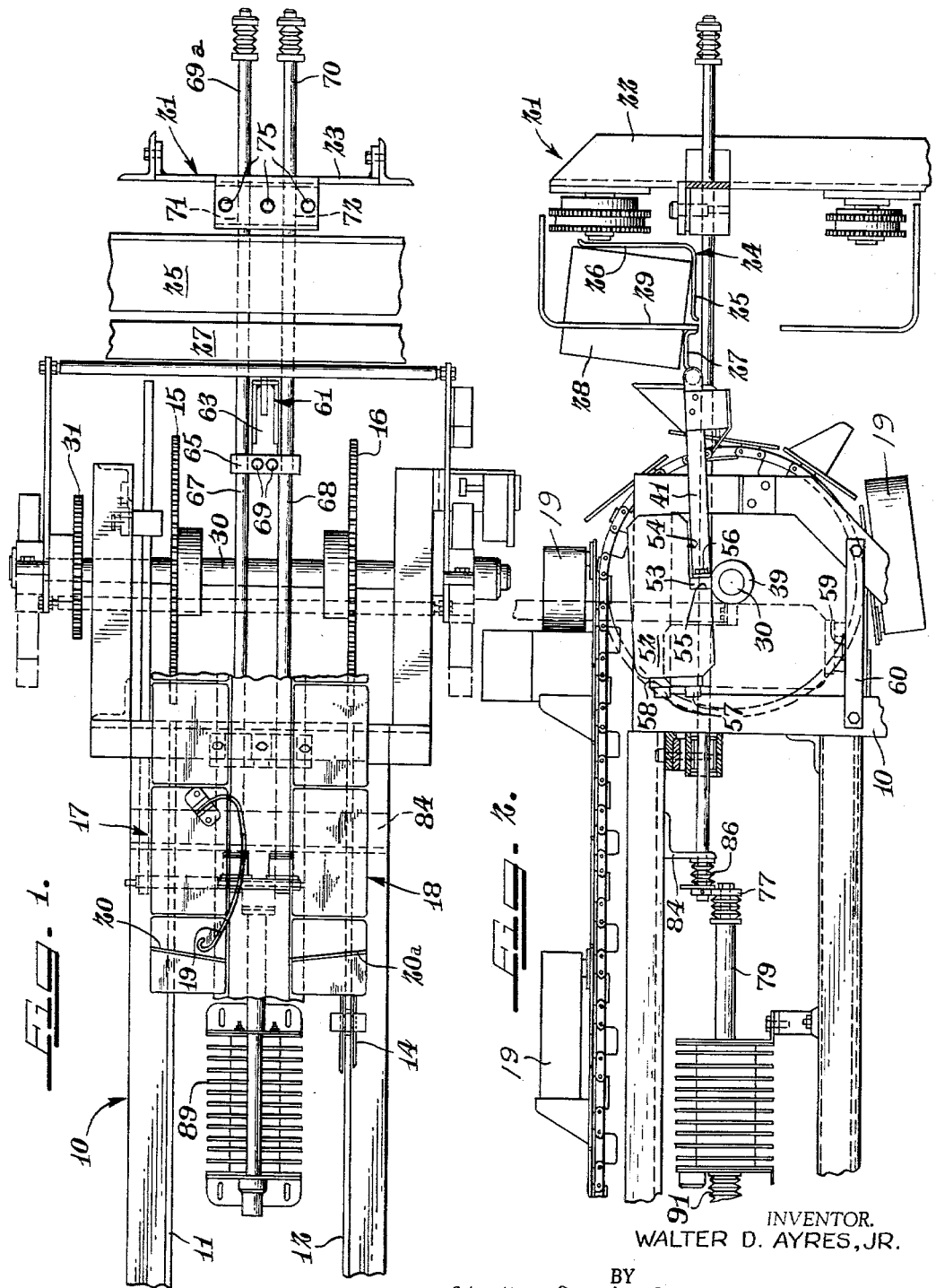

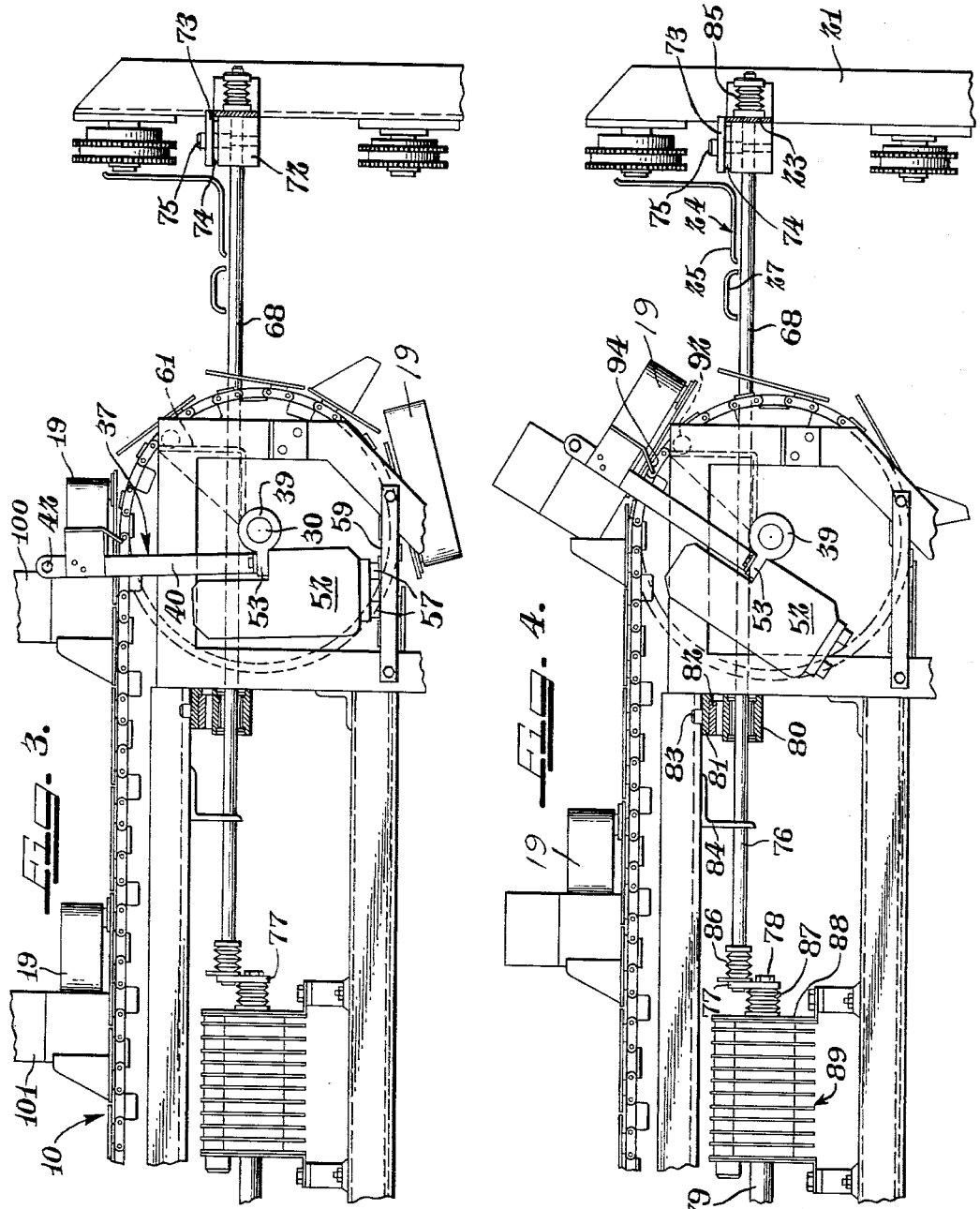

United States Patent Office 3,253,693
Patented May 31, 1966

3,253,693
TRANSFER MECHANISM FOR REMOVING
ARTICLES FROM CONVEYOR
Walter D. Ayres, Jr., Chicago, Ill., assignor to B. H. Bunn
Company, Chicago, Ill., a corporation of Illinois
Filed July 8, 1964, Ser. No. 381,161
9 Claims. (Cl. 198—24)

This invention relates to conveyors for moving bundles of envelopes or the like, and particularly to a means for transferring such bundles from one conveyor to an adjacent conveyor.

In my copending application, Serial No. 278,053, filed May 6, 1963, for Apparatus for Tying Moving Bundles, now Patent No. 3,189,163 dated June 15, 1965, there is described a conveyorized system for tying bundles of mail envelopes together. This system includes a main conveyor containing a horizontal flight on which are mounted spring clamps for holding a segregated bundle of envelopes. The clamped bundles move past a tying machine which ties each bundle together in one direction, and the tied bundle is then transferred from the main conveyor to a short transversely moving push-type conveyor which pushes the tied bundle to another tying machine where a cross-tie is made around the bundle. The transfer mechanism there disclosed is a fixed stripper device over which the bundle is propelled by the conveyor until the bundle is free of the conveyor clamp, and the bundle then completes the transfer by falling down the stripper onto the second conveyor.

Where the conveyor is to be used under conditions which cannot tolerate a malfunction of the stripper device, a more positive means for transferring the bundles must be used, and it is an object of this invention to provide an independently powered transfer device for transferring a bundle from one conveyor to another, said transfer device being positive in action.

More specifically, it is an object of this invention to control positively the movement of a bundle of envelopes, or the like, while transferring said bundle from one conveyor to another, and while turning the bundle through approximately 90° in the process of transferring it.

As a further specific object, this invention has within its purview the provision of a holding device for holding a bundle of envelopes in a given position on a conveyor, said holding device being, in turn, engaged and held by a bundle ejecting device for a time sufficient to enable the latter to complete the ejection of a bundle from said conveyor.

These and other objects of this invention will become apparent from the following detailed description of a preferred embodiment shown in the accompanying drawings in which:

FIG. 1 is a plan view of the transfer device of this invention shown mounted on the exit end of a conveyor;

FIG. 2 is a side elevational view of the transfer device and conveyor of FIG. 1, the conveyor being shown in a different stage of operation from that of FIG. 1;

FIG. 3 is a side elevational view of the transfer device of FIG. 1, showing the device in its initial stage of operation;

FIG. 4 is a side elevational view of the transfer device of FIG. 1 in an intermediate stage of operation; and FIG. 5 is an end elevational view, on an enlarged scale, of a portion of the transfer device of FIG. 1.

Referring now to the drawings for a detailed description of a preferred embodiment of the invention, and particularly to FIGS. 1 and 5, there is shown the frame 10 of a horizontally disposed conveyor, said frame having horizontal parallel rails 11, 12, on which are mounted parallel chains 13 and 14 passing over, and driven by, sprockets 15 and 16, respectively. Each chain carries a part 17 and 18, respectively, of a two-part clamping device for holding and transporting a bundle of envelopes on said conveyor while said bundle is being tied. Said bundle, at this stage, has already been tied together with a longitudinal tie, but it is still held in part 17 of the clamping device by a flat spring 19 secured at its forward end to part 17 and bearing against a vertical abutment 20 separate from, but adjacent to part 17 of the clamping device. A similar abutment 20a, separate from, but adjacent to part 18 is transversely spaced from and aligned with abutment 20 and constitutes in effect an extension of abutment 20. The separate abutment 20 and part 17 are secured to different links of chain 13 so that as the chain passes over sprocket 15 in moving to the right as viewed in FIG. 1, part 17 will commence to describe a curvilinear path before abutment 20 reaches sprocket 15 and while abutment 20 is describing a rectilinear path, thereby causing part 17 to tilt forwardly and away from abutment 20 to relieve the pressure of spring 19 upon the bundle.

It is contemplated that the upper conveyor flight will be moved horizontally from left to right, as viewed in FIGS. 1 and 2, during its bundle-carrying phase, and that the end of the conveyor represented by sprockets 15 and 16 forms a curved flight having its center of curvature at the common axis of the sprockets. The curved flight constitutes the exit end of the conveyor. Adjacent said exit end is a transfer conveyor 21, the details of which are shown in my aforementioned pending application, Serial No. 278,053, and hence will not be described herein. Said transfer conveyor is designed to accept bundles from the exit end of the adjacent conveyor and move them in a direction which is transverse to the general direction of movement of the bundles on the said conveyor. For this reason transfer conveyor 21 is disposed adjacent to the exit end of the bundle-carrying conveyor and is preferably secured to the frame 10 thereof by any suitable means (not shown), so as to bear a fixed special relation thereto. Thus, transfer conveyor 21 is provided with a frame 22 having a vertical cross plate 23 fixedly mounted thereon to support a portion of the transfer mechanism hereinafter to be described. Said transfer conveyor 21 also has mounted thereon a bundle-carrying plate 24 having a horizontally disposed bundle-supporting part 25 and a vertically disposed part 26 immediately adjacent the horizontal part 25. Between plate 24 and sprockets 15 and 16 is a horizontal plate 27 slightly spaced from part 25 and also slightly raised relative thereto, said plate 27 being fixedly supported by the frame 22 by appropriate frame members (not shown).

It is intended that a bundle of mail, such as 28, when transferred to conveyor 21 will be supported on parts 25 and 27 in such manner that the bundle will tend to lean toward the right as viewed in FIG. 2 against the vertical plate 26 in the manner shown in that figure. This means that the horizontal plate 27 will be disposed to the left of the center of gravity of bundle 28 as viewed in FIG. 2 so that said bundle will fall against, and be supported in part by, part 25. A space is provided between plates 25 and 27 into which the moving pusher 29 of the transfer conveyor 21 may extend so that regardless of how thin the bundle 28 may be, said pusher 29 will always contact the lowermost portion of the bundle and move it transversely of the direction of movement of chains 11 and 12 toward the second tying machine (not shown).

Sprockets 15 and 16 are mounted on a shaft 30 for rotation therewith, said shaft being driven through a sprocket 31 from any suitable source of power (not shown). Shaft 30 extends through and beyond both sides of frame 10, sprocket 31 being mounted on the extending end 32 of shaft 30, and separated from frame 10 by a sleeve bushing 33 abutting upon a bearing 34 supported from frame 10 by a plate 35. Also mounted on shaft end 32 is one bearing sleeve 36 of a guidance bridge 37 which extends over the conveyor to the opposite outwardly extending end 38 of shaft 30 on which it is oscillatably mounted by a bearing sleeve 39. The means for mounting guidance bridge 37 on shaft 30 is substantially identical for both ends 32 and 38 of shaft 30. Each end has flanged bushings 33a and 33b on which the bearing sleeves 36 and 39 are mounted, the bushings 33a and 33b being axially fixed on said shaft by a collar, such as 39a.

Guidance bridge 37 is comprised of a pair of arms 40 and 41, which may be secured to, or formed integrally with, bearing sleeves 36 and 39, respectively, so as to be oscillatable therewith. Said arms 40 and 41 are connected together at their outer extremities by a rod 42, the ends 43 and 44 of said rod 42 being threaded and extending through appropriate openings (not shown) in the ends of the arms 40 and 41. Rod 42 is secured to said arms 40 and 41 by opposed pairs of nuts 45 and 46, which are locked against the arms and which prevent rotation of rod 42 about its axis in the openings provided for the ends of the rod in arms 40 and 41.

It is contemplated that rod 42 will extend across the path of movement of a bundle of letters retained in a clamp 19–20 on conveyor 10, but that the said clamp 19–20 will not itself be contacted by the rod. Thus, the radial length of arms 40 and 41 is calculated to be such as to allow the clamps of the conveyor to pass under rod 42, but that the portion of a bundle of letters retained in the clamp and extending above the clamp, will contact the rod 42. It is further contemplated that inasmuch as the geometry of the clamp and conveyor is such that the bundle may not follow a path which is precisely circular with respect to the center of rotation of the conveyor shaft 30, whereas rod 42 will necessarily follow such circular path, some frictional forces may be developed between rod 42 and the projecting bundle of envelopes tending to move the bundle in the clamp and thus introduce ambient forces upon the envelopes which are undesirable. The frictional force between rod 42 and the envelopes is therefore reduced to a minimum by threading a plurality of anti-friction bearing elements of known construction 47 over rod 42 and retaining said anti-friction elements in two groups on said rod by means of spaced snap rings 48. A finger 49 is secured to rod 42 between snap rings 48, and is disposed to extend radially inwardly toward shaft 30. Said finger 49 is of such length as to extend slightly below the clamps 19–20, and in any event, to be contacted by a bundle of mail retained in said clamps and extending across to part 18 of the clamping device. The function of finger 49 will be described hereinafter.

Guidance bridge 37 swings freely on shaft 30, but is normally maintained in a substantially vertical position by a pair of weights 51 and 52, which are secured eccentrically to bearing sleeves 36 and 39, so as to be rotatable therewith. Each sleeve 36 and 39 is formed with an integrally extending ear 53 (FIG. 2) and each weight is formed with a notch 54, into which the ear 53 extends, said ear and notch overlying one another at 55. The radially inner end of each arm, 40, 41, is bent at right angles to the general plane thereof to overlie the side of ear 53 opposite that against which the weight bears, and each said arm, ear and weight are then firmly secured together by a bolt 56.

It may be noted that the eccentric location of each weight, such as 52, as well as that of the bridge and its arms, such as 41, relative to the axis of shaft 30, creates a torque upon guidance bridge 37 to hold said bridge in a vertical position. The weight, of course, will tend to rotate the bridge beyond a vertical position in a counterclockwise direction, as viewed in FIG. 2, but the rotation of the weight is arrested by a pair of rubber stop members 57, which are secured to a plate 58 fastened to the bottom of each weight. Said stop members 57 contact a horizontally disposed portion 59 on a strap 60 secured to frame 10 and limit thereby the degree of rotation of said guidance bridge 37.

The pusher mechanism for pushing a bundle from the conveyor and upon the transfer conveyor parts 24 and 25, comprises a weldment 61 (FIGS. 1 and 5) having a vertically disposed section 62 adapted to contact a bundle, and a horizontally disposed section 63. The end of the horizontally disposed section 63 is welded to a transverse bar 64, above which is disposed a second bar 65, said bars 64 and 65 having opposed semi-circular notches 66 formed therein which are adapted to embrace parallel push rods 67 and 68. A pair of screws 69 passing through bar 65 and threaded into bar 64 provide the clamping force for securing said bars and the associated weldment 61 to the parallel push rods 67 and 68 for movement therewith.

Push rods 68 and 67 extend horizontally below the forward moving flight of the conveyor, but above the return flight thereof. The forward ends 69a and 70 of push rods 67 and 68 are supported in anti-friction slide bearings 71 and 72 mounted on an angle iron 73, forming part of cross plate 23 on the frame 22 of transfer conveyor 21. A vertical adjustment is provided for the bearings 71 and 72 through shims 74 which are insertable between the angle iron 73 and the bearings 71 and 72 and clamped therebetween by the supporting screws 75.

The opposite ends 76 of the push rods 67 and 68 pass through and are secured to a vertically disposed plate 77 through which also passes the drive end 78 of the reciprocating rod 79 of an electrically driven linear actuator 89. Intermediate the ends of the rods 67 and 68 is an anti-friction bearing support 80 which is similar in construction to the anti-friction bearings 71 and 72, and like these bearings, is supported from a frame member 81 extending across parallel rails 11 and 12 and rigidly secured thereto. Said anti-friction sliding bearings 80 are vertically adjustable relative to the frame member 21 by means of shims 82, the sliding bearings 80 being secured to the frame member 81 through suitable screws 83 which serve to clamp the sliding bearing members against the shim 82 and frame member 81. A stop for limiting the movement of rods 67 and 68 towards the right, as viewed in FIGS. 3 and 4, for example, is provided by an angle iron 84 extending transversely of the conveyor and secured to parallel rails 11 and 12. Said angle iron 84 has openings therein through which the rods 67 and 68 pass. Plate 77 is secured to the ends of said rods 67 and 68 on the one hand and to the end 78 of rod 79 on the other, so that said push rods 67 and 68 are constrained to move with rod 79. To avoid excessive noise at the ends of the movements of the rods, resilient washers 85, 86 and 87 are inserted between the abutment to be contacted by the abutments on the rods. Thus, as shown in FIGS. 1 and 2, when the push rods 67 and 68 are at the limit of their movement to the left, resilient washers 87 abut upon the frame 88 of the linear actuator 89 and washers 85 abut upon the cross plate 23 of the frame 21. When the push rods 67 and 68 are at the limit of their movement to the right, as viewed in FIGS. 1 and 2, washers 86 abut upon the angle iron stop 84. An additional series of resilient washers 91 (FIG. 2) serve to limit the movement of the rod 79 through the linear actuator 89.

The washers of which the various groups 85, 86, 87 and 91 are composed may vary or alternate in composition within a group, such that some of the washers may be comprised of nylon, others of rubber, and still others of leather, or like relatively non-resilient material, to secure the desired shock absorbing action combined with noiselessness and long life.

Linear actuator 89 is an electric motor of known type in which the field is made to travel linearly instead of rotatively, so that its armature is caused to reciprocate instead of rotate. Such actuators are well known and the details of construction thereof will not be described herein.

The linear actuator 89 selected to illustrate this invention is operated from a 3-phase 230 volt 60 cycle alternating current and is designed to extend its rod 79 to the right, as viewed in FIG. 2, for example, by the closing of a double-pole, single-throw, normally open switch, shown schematically at 90 in FIG. 5. Said switch 90 is of the micro-switch type and is provided with a roller 92 mounted on the end of a switch arm 93, said roller 92 being in the path of movement of a trip 94 secured to arm 41 of guidance bridge 37. Said linear actuator, after having been operated to move its rod 79 to the right, as viewed in FIG. 2, is moved in the opposite direction and reset by a switch 95 (FIG. 5) which is mounted on a fixed part 96 of conveyor 10 and is provided with a roller 97 which is connected to a switch arm 98 adapted to operate a double-pole, double-throw type of switch. Said roller 97 is in the path of movement of a trip 99 secured to chain 14, so as to be movable therewith. Said switch 95 normally connects the linear actuator for actuation of its rod 79 to the right, as viewed in FIG. 2, but when trip 99 contacts roller 97, the connections through the switch are reversed so that the switch then reverses the lead to the actuator to reverse its direction of movement and thereby moves rod 79 to the left, as viewed in FIG. 2, to its starting position. The movement of the rod 79 is extremely rapid, so that it completes its movement in either direction while one of the trips 94 or 99 is passing over its respective switch actuating roller 92 or 97. After trip 99 passes over roller 97, switch 95 is restored to its initial condition, that is to say, the connections are again reversed to prepare the actuator for moving its rod to the right, as viewed in FIG. 2, just as soon as trip 94 again contacts roller 92 of switch 90.

The operation of the guidance bridge 37 is as follows:

Referring to FIG. 3, and assuming that the conveyor 10 is in motion so that the upper flight thereof is moving towards the right, as viewed in this figure, the clampings devices 17 and 18 and the associated spring 19 will likewise be moving toward the right and may have bundles 100 and 101 clamped therein. At the stage shown in FIG. 3, guidance bridge 37 is under the influence of the weights 52 and hence is disposed with its arms 40 and 41 in a substantially vertical direction. The said guidance bridge 37 is held in this position by the contact established between the stops 57 and the horizontal portion 59 of the frame. In this position the rod 42 and its antifriction roller elements 47 extend across the path of movement of bundle 100 and above the highest part of the clamping device which holds said bundle on the conveyor. As bundle 100 continues to move to the right, as viewed in FIG. 3, contact is established between said bundle and the anti-friction rollers 47, whereupon continued movement of the bundle 100 by the conveyor 10 causes guidance bridge 37 to rotate about its shaft 30 in the manner shown in FIG. 4. During such movement bundle 100 is tilted in the manner shown in FIG. 4, and commences to leave the clamps 17, 18, 19 and 20.

Continued movement of the conveyor 10 and bundle 100 around the sprockets 15 and 16, brings the trip 94 (FIG. 4) into contact with the roller 92 of switch 90, whereupon linear actuator 89 is energized and its rod 79 is moved rapidly to the right, as viewed in FIG. 2, to the end of its movement in that direction, that is, until washers 86 strike stationary angle iron 84 on frame 10. The location of roller 92 with respect to trip 94 is such that at approximately the time that the switch associated with roller 92 is actuated, an opening 102 in weldment 61 secured to rods 67 and 68, is aligned with finger 49 on guidance bridge rod 42. Thus the movement of the weldment 61 to the right by the linear actuator 89 causes the finger 49 to be threaded into opening 102, and the guidance bridge is then held in its lowered position so long as the finger is threaded in said weldment. During the latter part of the movement of the weldment over finger 49, said weldment is in contact with bundle 100 and forcibly ejects said bundle from the clamping devices 17, 18, 19 and 20, and upon the horizontal plates 25 and 27 of the transfer conveyor 21. Bundle 100 then assumes the position shown by bundle 28 in FIG. 2. In this position said bundle is clear of the guidance bridge and the latter is then ready to be moved backward to its vertical position shown in FIG. 3.

Thus guidance bridge 37 is held in its horizontal position, as shown in FIG. 2, until the bundle causing the bridge to move downwardly has been ejected by the linear actuator 89. It may be appreciated at this point that weights 52 should be of such magnitude as to cause guidance bridge 37 to exert a continuous pressure upon a bundle 100 until said bundle is ejected by the actuator. Failure to exert such pressure may cause said bundle to fall out of the conveyor due to the release or opening of the clamping device by the movement of said device around the sprockets, said movement resulting in a divergence of the clamping members and a release of the bundle. Should a bundle be released prematurely, it may fall unpredictably upon the plates 24, 25, both as to orientation of the planes of the letters and of the location of the bundle itself on said plates, so that the succeeding operation either cannot be performed, or else is performed incorrectly.

Continued movement of the conveyor causes trip 99 to engage roller 97 of switch 95 to reverse the connections to actuator 89 and thereby cause it to operate in a reverse direction to withdraw rod 79 and thus move weldment 61 to the left, as viewed in FIG. 2, to its starting position as shown in dotted outline in FIG. 3. In this position said weldment 61 is out of contact with the conveyor and with the clamps 17, 18, 19 and 20, and any bundle that may be thereon. Inasmuch as actuator 89 is energized only during the period that a trip 94 or 99 is engaging a switch 90 or 95, no energy is expended by said actuator 89 when the rod 79 is at rest at either end of its movement.

It may be noted that the clamping device part 18 and its adjacent abutment 20a are transversely spaced a distance which is great enough to allow parts 17 and 18 and their respective abutments 20 and 20a to clear rods 67 and 68 even though said rods project continuously outwardly through the curved flight.

The combination of conveyor flights, clamps, guidance bridge and ejecting mechanism described above provides a positively controlled means for turning an article on a conveyor through 90°, ejecting it from said conveyor and depositing it upon an adjacent conveyor properly oriented for a subsequent tying operation thereon.

It is understood that the foregoing description is merely illustrative of a preferred embodiment of the invention and that the scope of the invention is not to be limited thereto, but is to be determined by the appended claims.

I claim:

1. In combination, a conveyor comprising a frame, an endless article-moving device on said frame, means on the frame establishing for the article-moving device a horizontal flight and a curved flight adjacent the horizontal flight, spaced clamping means on the endless article-moving device and movable therewith over the said horizontal flight toward and around said curved flight, each said clamping means including a rigid abutment and a resilient abutment adapted to hold an article against said rigid abutment, said rigid and resilient abutments being automatically separable to release articles held thereby when said abutments pass around the curved flight, automatically operable clamp means adapted to engage and hold said articles against their respective rigid abutments while said articles are passing over said curved flight and are thereby released from said clamping means, and power operated push means adapted to push said articles held by said automatically operable clamp means out of said automatically operable clamp means and off said conveyor.

2. The combination described in claim 1, said automatically operable clamp means comprising a bar extending across said endless article-moving device in the path of movement of the articles thereon, a pivoted support for the bar adapting the bar to swing around the curved flight to maintain contact with the moving articles as said articles pass around said curved flight, and means acting upon the bar yieldingly to resist such swinging movement of the bar around the curved flight.

3. The combination described in claim 2, and anti-friction roller means on said bar in contact with said moving articles to accommodate relative movement between the bar and the articles.

4. The combination described in claim 2, said pivoted support being concentrically disposed with respect to the center of curvature of the said curved flight on the conveyor, and said means acting upon the bar yieldingly to resist such swinging movement of the bar comprising a weight secured to the pivoted support in eccentric relation to the center of curvature of said curved flight.

5. The combination described in claim 1, a transfer conveyor disposed adjacent the curved flight and adapted to receive articles pushed out of the clamp means, said automatically operable clamp means comprising a bar extending across said endless article moving device in the path of movement of the articles thereon, a pivoted support for the bar to swing around the curved flight to maintain contact with the moving articles, means acting upon the bar yieldingly to resist such swinging movement of the bar around the curved flight, and means on the power-operated push means and on said bar adapted to inter-engage one another to hold the bar in a predetermined position relative to the transfer conveyor until said articles are pushed out of the clamp means.

6. The combination described in claim 1, said power-operated push means comprising a reciprocating motor, means mounting said motor on said conveyor, rods reciprocable by said motor, an article-contacting abutment secured to said rods and movable therewith, said automatically operable clamp means comprising a bar extending across said endless article-moving device in the path of movement of the articles thereon, a pivoted support for the bar adapting the bar when contacted by a moving article to swing around the curved flight to a position in proximity to said rods, and inter-engageable means on the article-contacting abutment and on the bar adapted to hold said bar in proximity to said rods while the said abutment contacts and pushes said articles out of said automatically operable clamp means and off said conveyor.

7. The combination described in claim 6, said motor comprising an electrically operated linear actuator, switch means on the conveyor operated by the automatically operable clamp means when said automatically operable clamp means is swung by an article to a predetermined angular position relative to said conveyor frame, said switch means being adapted to control energization of said linear actuator to move said rods in a direction to push an article off the conveyor, and switch means actuated by said endless article-moving device for controlling energization of said linear actuator to move said rods in a direction opposite that of said first-mentioned direction.

8. The combination described in claim 6, said inter-engageable means comprising a finger secured to the bar and extending substantially radially inwardly relative to the pivoted support for the bar, and an apertured weldment in the abutment, said finger being threaded into the aperture in said apertured weldment as the abutment contacts and pushes said articles out of said automatically operable clamp means and off said conveyor.

9. The combination described in claim 6, a transfer conveyor disposed adjacent the curved flight and adapted to receive articles pushed out of the clamp means, means on said transfer conveyor supporting said rods for reciprocating movement relative to said transfer conveyor, an additional rigid abutment on the endless article-moving device laterally spaced from and aligned with the first-mentioned rigid abutment, said rods extending between said first-mentioned and additional rigid abutments, and said reciprocating motor being disposed below said horizontal conveyor flight.

References Cited by the Examiner

UNITED STATES PATENTS 2,667,958   2/1954   Malhiot _____ 198—24

HUGO O. SCHULZ, *Primary Examiner.*

EDWARD A. SROKA, *Examiner.*